US007080369B1

(12) United States Patent
Crowl et al.

(10) Patent No.: US 7,080,369 B1
(45) Date of Patent: Jul. 18, 2006

(54) METHOD AND APPARATUS FOR PRODUCING COMPRESSED COMPILER PRODUCTS

(75) Inventors: Lawrence A. Crowl, Mountain View, CA (US); Neal M. Gafter, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 322 days.

(21) Appl. No.: 09/649,270

(22) Filed: Aug. 28, 2000

Related U.S. Application Data (60) Provisional application No. 60/163,892, filed on Nov. 5, 1999, provisional application No. 60/193,923, filed on Mar. 31, 2000.

(51) Int. Cl.
 G06F 9/45 (2006.01)
(52) U.S. Cl. .................................................... 717/159
(58) Field of Classification Search ........ 717/140–143, 717/151–161, 162–166; 709/246–247; 707/101; 708/200–203; 710/68
 See application file for complete search history.

(56) References Cited

U.S. PATENT DOCUMENTS

| | | | | |
|---|---|---|---|---|
| 4,942,467 A | * | 7/1990 | Waldman et al. | 375/240.14 |
| 5,640,559 A | * | 6/1997 | Silberbauer et al. | 707/101 |
| 5,664,189 A | * | 9/1997 | Wilcox et al. | 707/205 |
| 5,881,151 A | * | 3/1999 | Yamamoto | 713/200 |
| 5,923,880 A | * | 7/1999 | Rose et al. | 717/145 |
| 5,991,713 A | * | 11/1999 | Unger et al. | 704/9 |
| 6,005,503 A | * | 12/1999 | Burrows | 341/67 |
| 6,163,811 A | * | 12/2000 | Porter | 709/247 |
| 6,442,680 B1 | * | 8/2002 | Elnozahy | 712/227 |
| 6,457,173 B1 | * | 9/2002 | Gupta et al. | 717/149 |
| 6,606,588 B1 | * | 8/2003 | Schaumont et al. | 703/15 |

FOREIGN PATENT DOCUMENTS

JP 10074152 A * 3/1998

OTHER PUBLICATIONS

Klein S. T., Bookstein A., Deerwester S., "Storing text retrieval systems on CD-ROM: compression and encryption considerations", Jul. 1989; ACM Trans. on Information Systems 7 ; pp. 230-245.*

Mogul et al., "Potential benefits of delta encoding and data compression for HTTP", Sep. 1997, Proc. ACM SIGCOMM'97 Symposium.*

Ainon, "Storing text using integer codes", 1986, Proceedings of the 11th coference on Computational linguistics.*

Storer et al., "The Macro Model for Data Compression", 1978, Proceedings of the 10th Annual ACM symposium on Theory of computing.*

* cited by examiner

*Primary Examiner*—Kakali Chaki
*Assistant Examiner*—Tuan Anh Vu
(74) *Attorney, Agent, or Firm*—Beyer Weaver & Thomas, LLP (57) ABSTRACT

Improved techniques for reducing the size of compiler products are disclosed. The techniques facilitate reduction of size by providing differential schemes aimed at producing compiler related information in a compressed form. The compressed compiler related information include symbol names associated with symbols encountered in programming languages. The improved techniques yield improved compilation times and compiler products that utilize substantially less storage space (e.g., disk storage space).

16 Claims, 7 Drawing Sheets

```
namespace foo{
    int x;
    long y;
}
```

Fig. 1

```
namespace babo{
    float x;
    float y;
}
```

```
namespace foo{
     class bar {
     void buz()
     }
}
```
— 500

METHOD AND APPARATUS FOR PRODUCING COMPRESSED COMPILER PRODUCTS

CROSS-REFERENCE TO RELATED APPLICATION

This application claims the benefit of U.S. Provisional Patent Application No. 60/163,892, filed Nov. 5, 1999, entitled "DIFFERENTIAL LINKER SYMBOL NAMES AND DIFFERENTIAL MEMBER NAMES IN CLASS DEBUG INFORMATION," which is hereby incorporated by reference herein; and U.S. Provisional Patent Application No. 60/193,923, filed Mar. 31, 2000, entitled "METHOD AND APPARATUS FOR PRODUCING COMPRESSED COMPILER PRODUCTS," which is also hereby incorporated by reference herein.

BACKGROUND OF THE INVENTION

1. Field of the Invention

The present invention relates to compilers and, more particularly, to methods and apparatus suitable for generation of improved compiler products.

2. Description of the Related Art

A computer program is typically written in a high-level programming language, such as Fortran, C, C++, Java, etc. Computer programs written in such high-level programming languages are also referred to as source programs. Source programs are composed of one or more source files. A compiler converts a source file into an object file. A linker combines one or more object files into an executable program. A computer that interprets (runs) the executable program will behave as specified in the source program.

Figure 1:
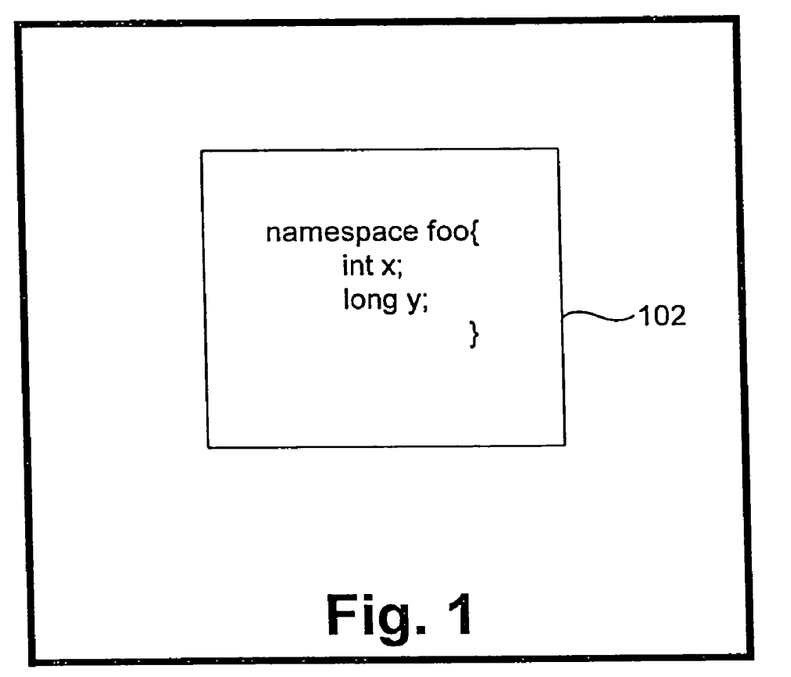
FIG. 1 is a portion of a representative C++ program.

Similar to textual writing, a high-level programming language (namely, source code) is written as a sequence of characters. As in textual writing, these characters are grouped into "words", which are called tokens. These tokens include identifiers, keywords, operators, and punctuation. FIG. 1 is portion 102 of a representative C++ program. The portion 102 includes: identifiers "foo", "x", and "y"; keywords "namespace", "int", and "long"; punctuation ";", "{", and "}", but does not include any operators.

Source programs typically use a sequence of tokens to name program symbols. The portion 102 illustrated in FIG. 1 declares three program symbols, a "namespace", an "int" variable, and a "long" variable. The "namespace" is a container, and has the two variables as its members. Typically, programs use short context-dependent names for these symbols. The names are "foo", "x", and "y", respectively. Occasionally, programs may use longer, and more complex, context-independent names. They are "::foo", "::foo::x", and "::foo::y", respectively. These names include the names for the symbol's container as well as the identifier for the symbol itself.

Figure 2:
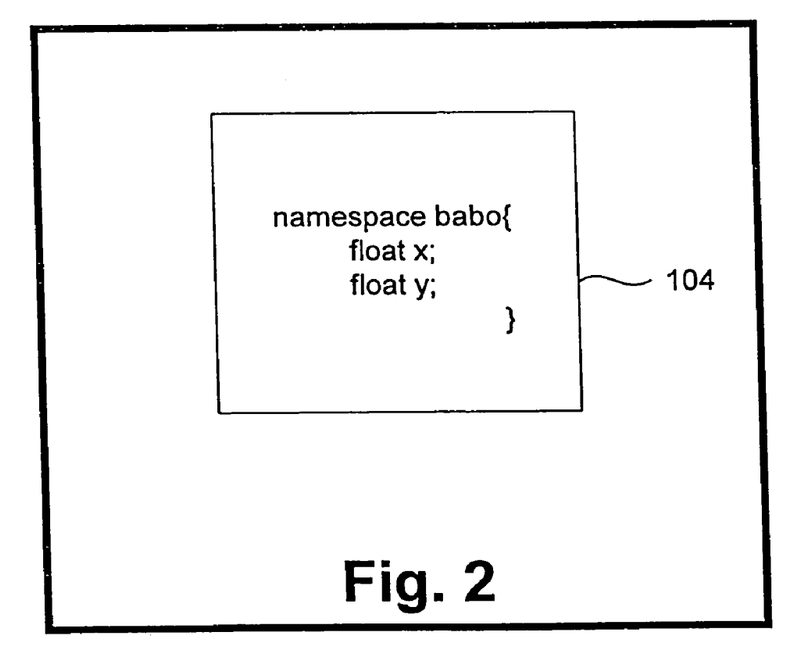
FIG. 2 illustrates another portion of a representative source program written in C++ that declares two variables.

Source programs may declare symbols with identical context-dependent names, but different context-independent names. FIG. 2 illustrates another portion 104 of a representative source program written in C++ and serves to declare a "namespace" and two "float" variables. These variables have context-dependent names "x" and "y", which are identical to the "int" and "long" variables declared in FIG. 1. However, their context-independent names are "::babo::x" and "::babo::y", which are different from the context-independent names for the other variables.

In addition to the compiler, many other tools may need to refer to C++ program symbols. These other tools include a linker, a debugger, a performance analyzer, etc. Because the context for symbols' names is generally not accessible to other tools, they must refer to symbols with the longer, context-independent names. Moreover, these tools generally do not, and should not, understand the idiosyncratic syntax of the long names. Therefore, the compiler encodes a long, context-independent name into a single identifier. This encoded name is also called the linker name because the linker is the only required tool that must use the encoded name. For the purposes of most tools, the encoded name is the only name for a symbol, which avoids idiosyncratic processing. Thus, encoding symbol names are a useful mechanism and an important part of the compiling process.

An example encoded name for the symbol identified by "x" in FIG. 1 is "__1cDfooBx_", where "__1" is a prefix identifying the particular encoding algorithm, "c" encodes the kind of symbol (function or, in this case, variable), "foo" is the context-dependent name for the container of the symbol, "D" is the length of the string "foo", "x" is the context-dependent identifier for the symbol, "B" is the length of the string "x", and "_" is the name terminator. Likewise, the encoded name for the symbol identified by "x" in FIG. 2 has the encoded name "__1cEbaboBx_".

Unfortunately, however, the encoded symbol names are typically substantially longer than the original context-dependent names. As can be seen in FIGS. 1 and 2, even in the simplest cases, the encoding may result in encoded identifiers that are ten times longer than the original context-dependent identifier. Moreover, in more practical applications, symbols can have many levels of containers, with many containers having very complex names. In such cases, the length of the encoded identifiers for symbols can be very long. Encoded identifiers in excess of 5000 characters have been reported in some applications. The length of these identifiers is further compounded when they are used as part of application-specific data for non-critical applications. For example, debuggers typically require more data than is necessary for strict interpretation of the program. This data will use encoded names, which makes the size of the debugging data sensitive to the size of the encoded identifiers.

In any event, the encoded identifiers are used in the generation of computer products, such as object programs, executable programs, debugging information, etc. As a result, the length of the encoded identifiers will have a substantial impact on the overall size of the compiler products. Therefore, having long encoded identifiers in computer products not only adversely affects compilation time, but also yields compiler products that require large amounts of storage.

Conventionally, some efforts have lead to reduction in the size of encoded function names in isolated circumstances. In programming languages with overloaded functions, such as C++, the encoded name must often include a description of function parameter types. Since such descriptions could become long and are often repeated, one conventional approach has avoided the need to fully specify repeated parameters and thus reduce the size of an encoded name. This conventional approach employs a special marker noting that a parameter is repeated some number of times, thus requiring the complete description of a parameter type need only be done the first time it appears in a parameter list. Further, programming languages with very complex names, such as C++, often have duplicated types and symbols across the entire structure of the name, not just among parameters. Since these duplicated types and symbols could become long and are often repeated, avoiding the complete specification of duplicated types and symbols can also help reduce the size of an encoded name. One conventional approach has been to assign a unique number to each type and symbol during encoding, and then emit a special marker and the type or symbol number for a duplicate type or symbol, rather than emitting the full encoding for the type or symbol. These conventional approaches have not satisfactorily reduced the size of encoded symbol names or the size of compiler products and thus the problems mentioned above remain.

In view of the foregoing, there is a need for improved methods and apparatus for generating improved compiler products, specifically, reducing the storage impact of encoded names.

SUMMARY OF THE INVENTION

Broadly speaking, the invention relates to improved techniques for reducing the size of compiler products. In accordance with one aspect of the invention, an enhanced compiler can produce one or more compiler products with a reduced size. The enhanced compiler yields improved compilation times and compiler products that utilize substantially less storage space (e.g., disk storage space). A second aspect pertains to generating uncompressed compiler products. In one embodiment, compressed compiler related information associated with a compiler related product can be decompressed.

The invention can be implemented in numerous ways, including as a computer system, an apparatus, a method, and a computer readable medium. Several embodiments of the invention are discussed below.

As a method for generating compiler products in a compressed form, one embodiment of the invention includes at least the acts of: compressing a portion of compiler information to obtain compressed compiler information; and producing a compressed compiler product based on at least the compressed compiler related information.

As a method for generating symbol names in an uncompressed form, the symbol names being associated with compiler information, one embodiment of the invention includes at least the acts of: Identifying a compressed symbol name being associated with compiler information; obtaining information relating to the compressed symbol name; and decompressing the compressed symbol name based on the information relating to the compressed symbol name to obtain a symbol name in an uncompressed form.

As a compilation system suitable for compilation of source programs, one embodiment of the invention includes at least: an enhanced compiler suitable for generation of enhanced compiler products, wherein the enhanced compiler compiles a source program to produce the enhance compiler products with a reduced size in comparison with conventional compiler products produced by conventional compilers; and at least one enhanced non-compiler component that understands and utilizes the enhanced compiler products.

As a computer readable media including computer program code for generating compiler products in a compressed form, one embodiment of the invention includes at least: computer program code for compressing a portion of compiler information to obtain compressed compiler information; and computer program code for producing a compressed compiler product based on at least the compressed compiler related information.

As a computer readable media including computer program code generating symbol names in an uncompressed form, the symbol names being associated with compiler information, one embodiment of the invention includes at least: computer program code for identifying a compressed symbol name being associated with compiler information; computer program code for obtaining information relating to the compressed symbol name; and computer program code for decompressing the compressed symbol name based on the information relating to the compressed symbol name to obtain a symbol name in an uncompressed form.

The invention has numerous advantages. One advantage is that the length or size of the compiler products can be significantly reduced. Another advantage is that the efficiency at which compiler products can be produced is improved. Yet another advantage is that compiler products utilize less storage space.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to methods and apparatus for producing one or more compiler products with a reduced size. A compiler enhanced in accordance with the invention yields improved compilation times and smaller products (compiler products). In one embodiment, the invention is a mechanism for reducing the size of compiler products by using one encoded name to compress another.

Figure 3:
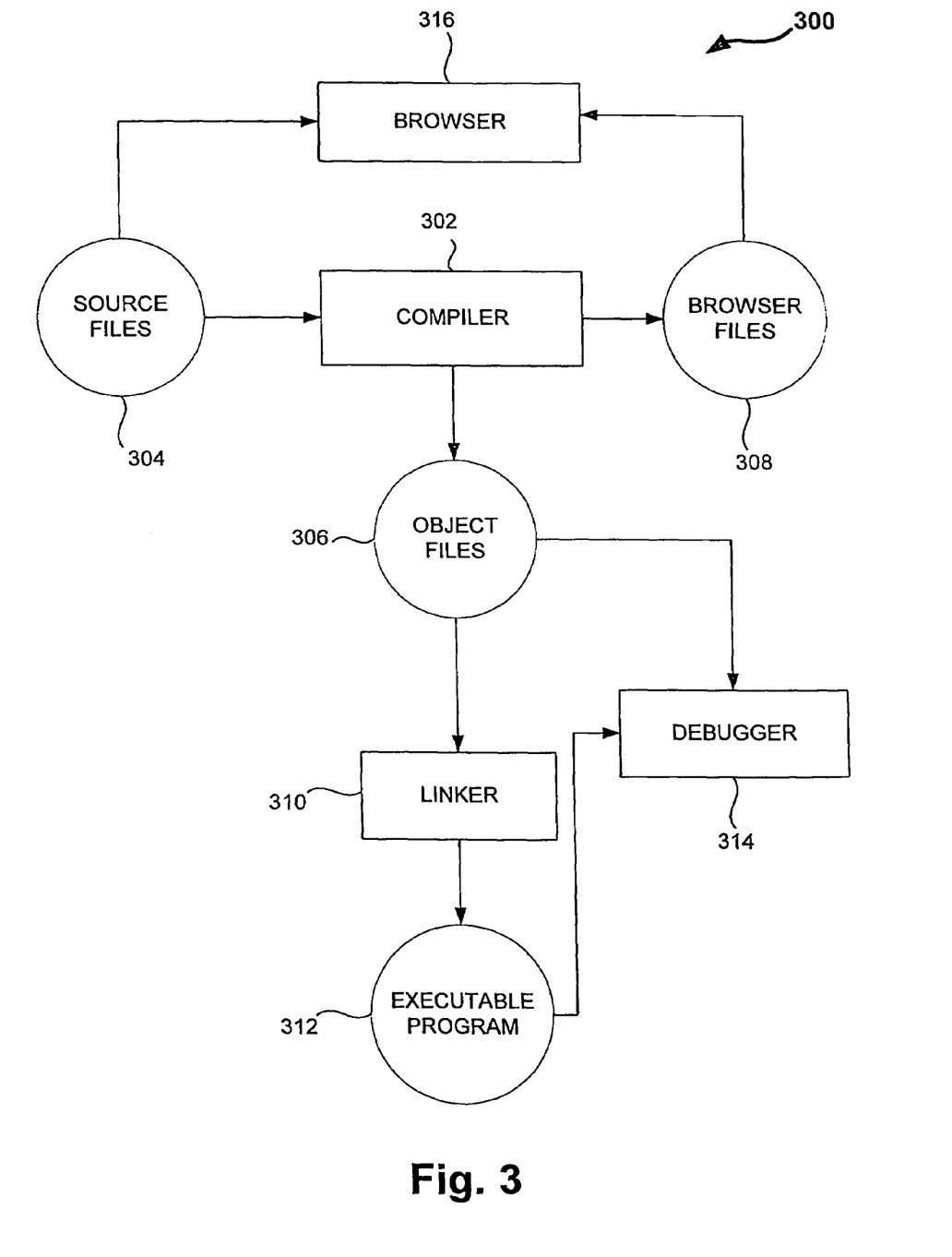
FIG. 3 illustrates an exemplary conventional compilation system.

The invention can be best understood within the context of a relatively conventional compilation system for program compilation, debugging, browsing, and execution. FIG. 3 illustrates an exemplary conventional compilation system 300. The conventional compilation system 300 produces products which include object files containing executable and debugging information, and source browser files containing code viewing information.

The conventional compilation system 300 includes a compiler 302 that receives one or more source files 304 and generates its products, namely one or more object files 306 and/or browser files 308. The conventional compilation system 300 also includes a linker 310 that receives the one or more object files 306 and produces an executable program 312. The object files 306 may be either separate or collected into libraries. An operating system of a computer (not shown) receives the executable program 312 and interprets the program.

The compiler 302 receives the one or more source files 304, then processes the source files 304 in a number of phases. These phases operate to parse text within the source files 304 into tokens and higher-level syntactic constructs, analyze the constructs for meaning and errors, synthesize lower-level instructions that implement the semantics, synthesize descriptions of the semantics, and generate the synthesized forms in a manner acceptable to other components of the compilation system. The compiler 302 phases are often more pedagogical than physical, and may be interleaved or bypassed as technical considerations warrant. Any given compiler 302 may have more or fewer phases without affecting the generality of the organization or the claims herein.

The conventional compilation system 300 also typically includes a debugger 314 that receives the executable program 312 and one or more of the object files 306 and cooperates with the operating system and a user of the computer to isolate defects (bugs) in the program. Further, the conventional compilation system 300 can include a browser 316 that receives one or more of the browser files 308 and one or more of the source files 304 and cooperates with the operating system and the user to display selected information about the program.

Other components in the compilation system require information in the compiler products. Each of these components has an input module that reads and interprets the contents of any applicable compiler products.

Any given compiler may produce one or more products without affecting the generality of the invention or the compilation systems with which it can be used. The invention requires no change to the overall internal compiler organization, thus enabling more wide-spread use of the invention. The invention requires a small modification to the generation phase of compilation. In particular, as detailed later, the generation phase must be modified at the points where encoded names are placed in the compiler product. The invention requires a small modification to the modules that read and interpret compiler products. In particular, as detailed later, the input module must be modified at the points where encoded names are read from the compiler product.

As described above, the context-independent name for a member of a container includes the name for the container of the symbol, so the encoding of the member must encode the container as well. Likewise, if the container is, in turn, a member of another container, the original member must encode both containers. When the encoded names for both a container and its member appear in the same compiler product, there is some redundancy between the two encoded names.

Figure 4:
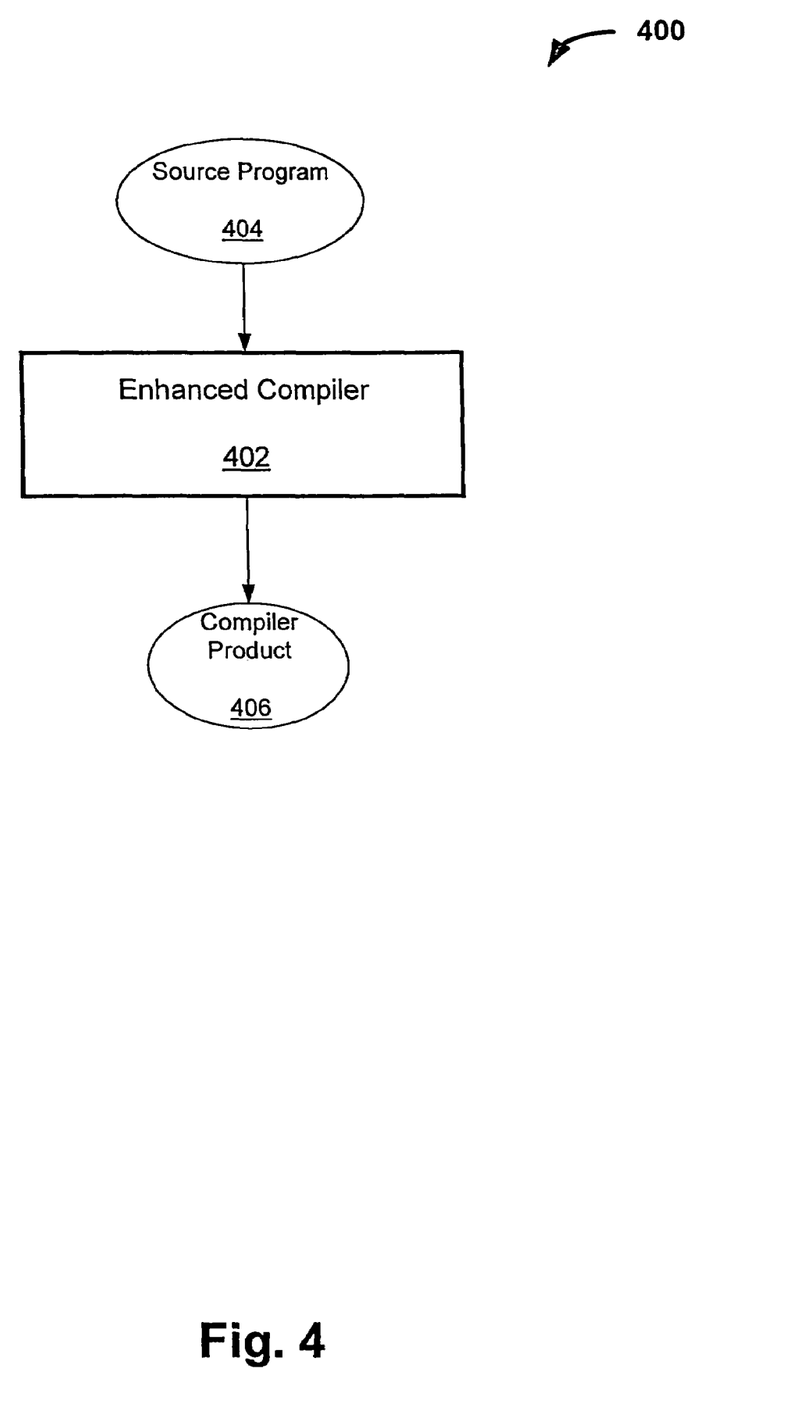
FIG. 4 illustrates an exemplary compiler system according to one embodiment of the invention.

FIG. 4 illustrates an exemplary compiler system 400 according to one embodiment of the invention. The exemplary compiler system 400 includes an enhanced compiler 402 suitable for generation of a variety of enhanced computer products. The enhanced compiler 400 is generally similar to the compiler 302 except that it is enhanced in accordance with the invention to produce compiler products with a reduced size through use of differential encoding of names for symbols within the compiler products.

The enhanced compiler 402 receives a source program 404 for compilation and generation of computer products 406. As examples, the enhanced computer products 406 can include object file(s), executable program, and browser file(s). The computer products 406 are enhanced by being reduced in size or compressed as compared to conventionally produced computer products. For example, size reduction to the computer products in the range of 15–40 percent can be achieved in accordance with the invention. In addition, compiler products can be generated faster than the conventional models. The source program 404 is typically a computer program written in a programming language such as Ada, C++, Fortran, Pascal, Java, etc.

Figure 5A:
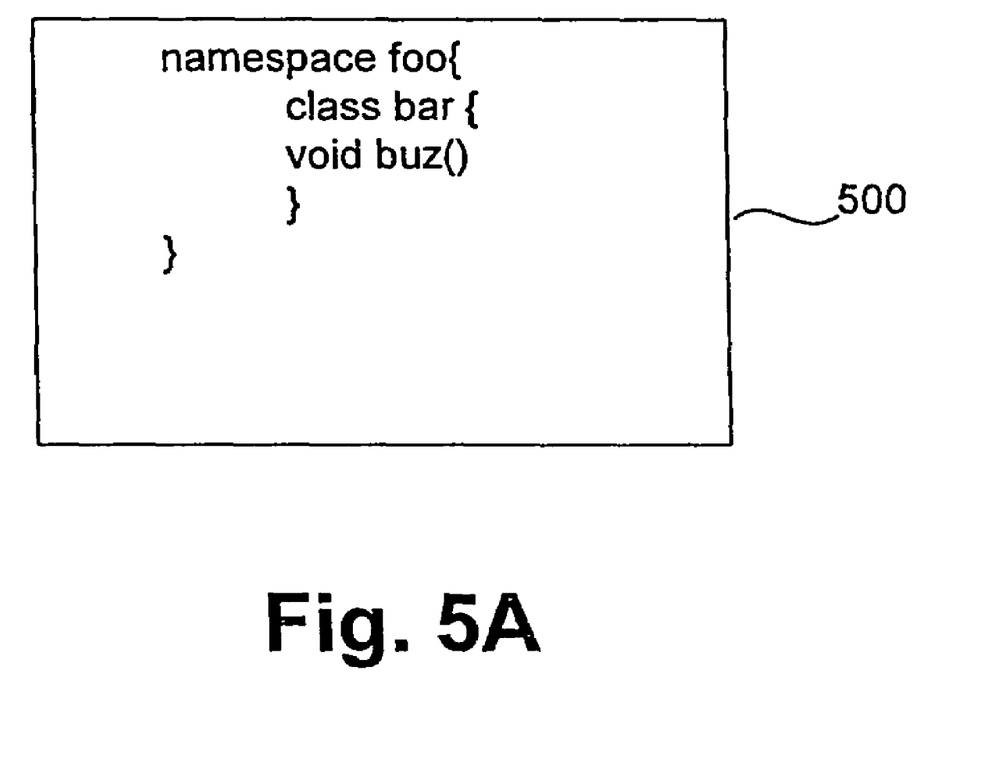
FIG. 5A illustrates an exemplary C++ declaration with a namespace "foo" containing a class "bar" containing a function "buz" as would be found in a C++ source program.
Figure 5B:
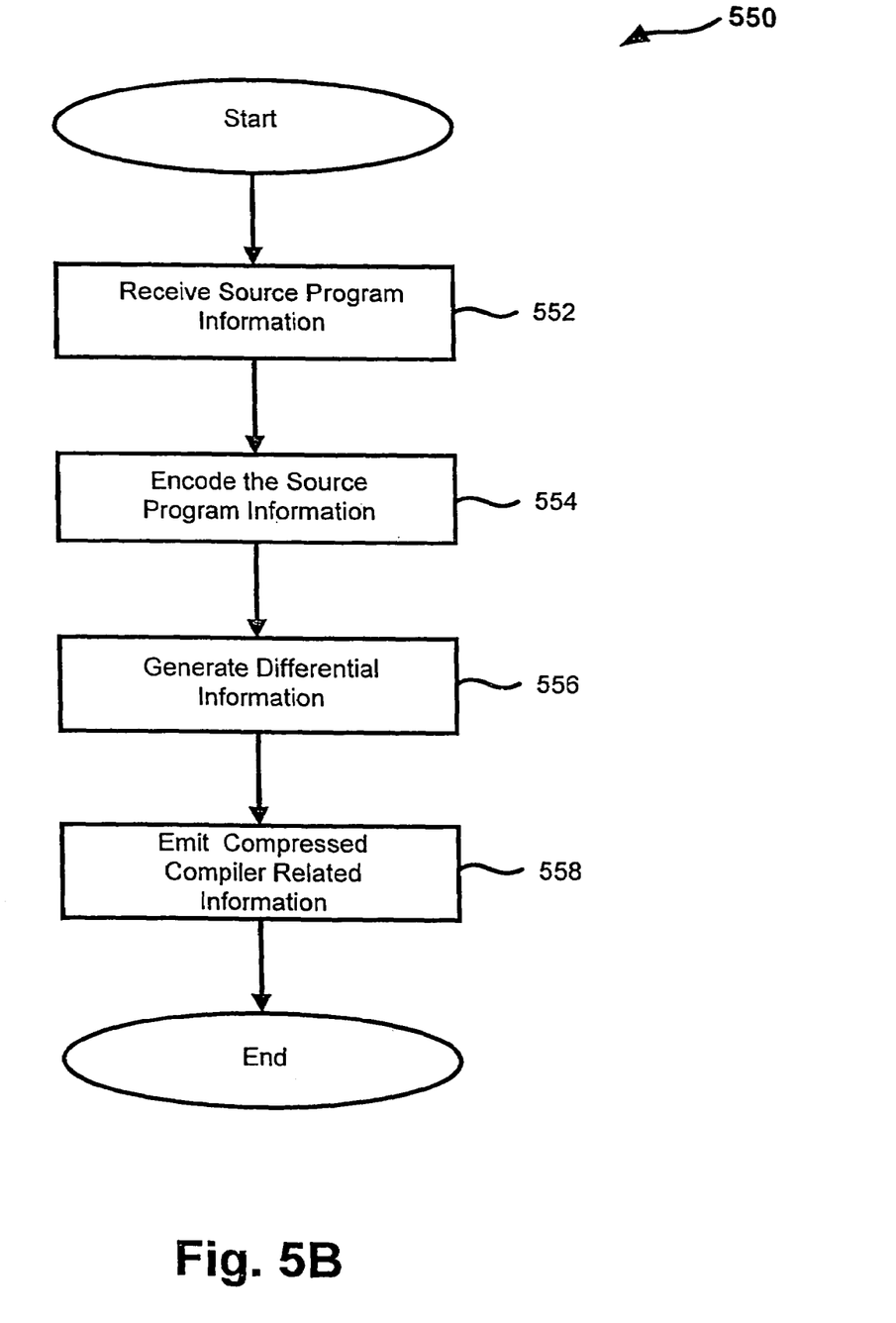
FIG. 5B illustrates a differential method for generating compiler related information in a compressed form in accordance with one embodiment of the invention.
Figure 6:
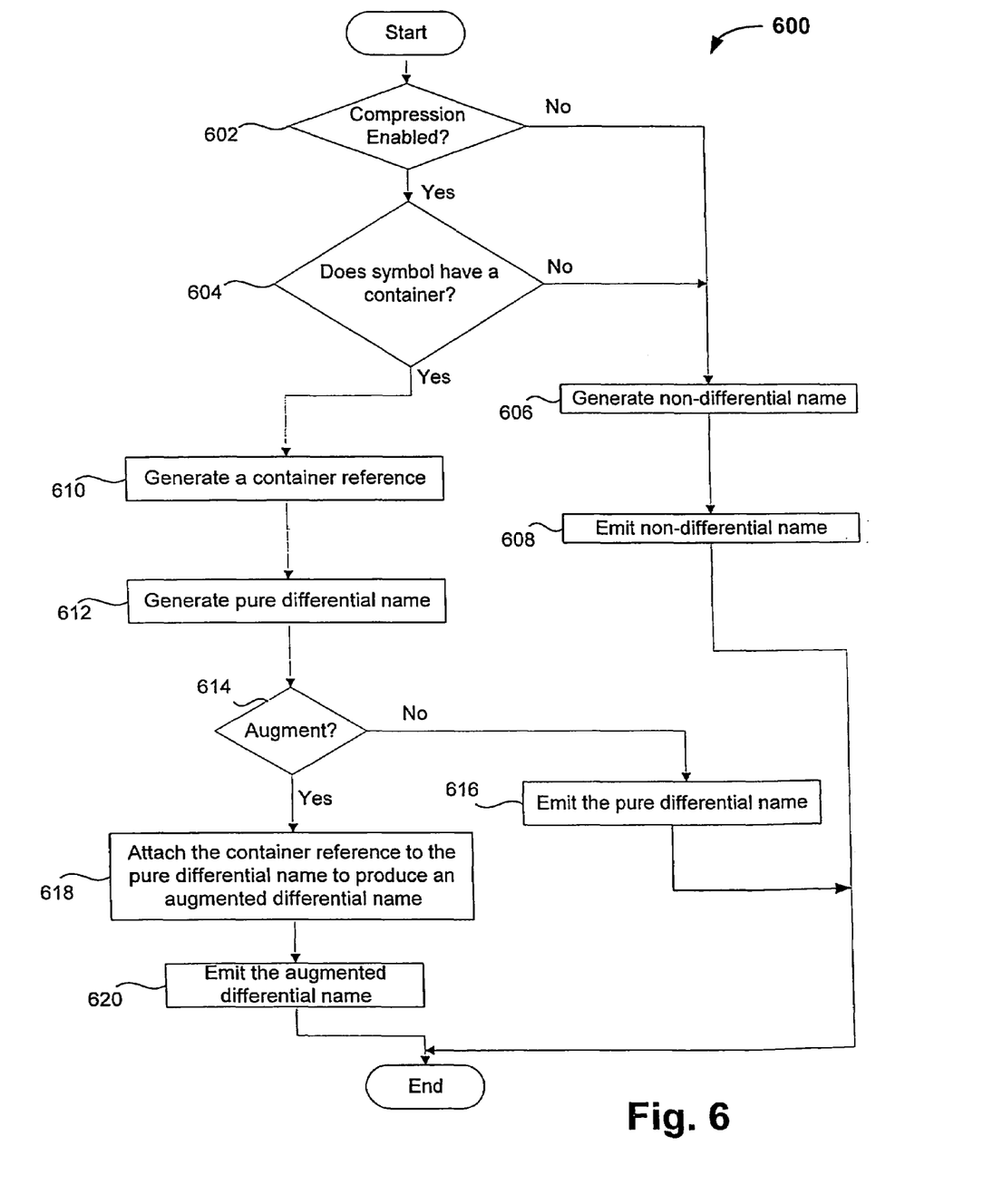
FIG. 6 is a flow diagram illustrating encoding name processing according to one embodiment of the invention.

The generation of the reduced size compiler products is described in more detail with respect to FIGS. 5A, 5B and 6.

FIG. 5A illustrates an exemplary C++ declaration 500 with a namespace "foo" containing a class "bar" containing a function "buz" as would be found in a C++ source program. The encoded names for these symbols are, for example, "__1nDfoo_", "__1nDfooDbar_", and "__1cDfooDbarDbuz6M_v_", respectively. The portions "__1", "Dfoo", and "Dbar" are repeated between (as opposed to within) these different encoded names. As a consequence, there is redundancy within the compiler product, and thus the overall compiler product is likewise redundant.

According to the invention, the difference between the encoded container name and the encoded member name is placed into the compiler product instead of the full encoded name for the member. This difference is referred to as the differential name.

Placing a differential name for a member in a compiler product requires that the product provide enough information so that a receiving component may find the encoded name of the container and then, using the encoded name of the container and the difference, determine (i.e., unencode) the original encoded name of the member.

The particular mechanism for finding the encoded name of the container will necessarily depend upon the particular compiler product. However, two broad category mechanisms are worth noting. First, if the container for a name is known a priori from context, then the compiler product may include a pure differential name. The compiler product does not explicitly identify the container. An example of this category is debugging information that provides a list of names for members of a class. The members necessarily have the class as their container, and need not explicitly mention it. Second, if the container for a name is not known, the differential name must be augmented with some other information that identifies the name.

The pure differential names for symbols "bar" and "buz" referenced in the declaration 500 of FIG. 5A are, for example, "nDbar" and "cDbuz6M_v", respectively. The symbol "foo" has no container, hence has no differential name, so its full encoding "1nDfoo_" is used. These particular names have size reductions of 62% and 57%, respectively. Within the Sun C++ debugging information, the augmented differential names for symbols "bar" and "buz" referenced in the declaration 500 of FIG. 5A are, for example, "nDbar(0,26)" and "cDbuz6M_v(0,32)", respectively, where the parenthesized number indicates the container's type number which is defined and used in other debugging information. These particular names have size reductions of 15% and 29%, respectively. More complex encodings may have dramatically larger reductions.

The cumulative size reductions of names within a compiler product can achieve a 15% to 40% reduction in the overall size of the product. As a result of the reduced product size, compile time is also reduced. Furthermore, other components in the compilation system may also have reduced execution times.

Generating pure differential names involves parsing a full encoded name. The parsing serves to identify the parts of the encoded name that are expected to be different, then looking for one or more substrings within the member name that matches one or more substrings within the container name. This parsing method is most effective when exploiting the known structure of encoded names.

Table 1 provided below illustrates three principal parts of two representative forms of full encodings. These two representative forms of full encodings are emitted by Sun Microsystems, Inc.'s C++ compilers (Sun C++ compilers). The three parts are the identifying prefix, the symbol type, and the symbol encoding. The parts of the full encoding provided in Table 1 pertain to the symbol "buz" referenced above with respect to FIG. 5A. Note that combining the prefix, type and symbol for the first form of encoding yields "_1nDfooDbar_", which is the full encoding for "buz" noted above.

TABLE 1

| Part | First form | Second form |
| --- | --- | --- |
| Prefix | _1 | _0 |
| Type | N | t6 |
| Symbol | DfooDbar_ | DfooDbar |

Table 2 provided below illustrates the refinement of the symbol part for a member, showing the outer container description, the inner container description, a separator between them, the member description, and a suffix. Neither of the two representative forms of full encodings uses all parts of this general refinement.

TABLE 2

| Part | First form | Second form |
| --- | --- | --- |
| Prefix | _1 | _0 |
| Type | c | f |
| Outer | Dfoo | Dfoo |
| Separator |  | 5 |
| Inner | Dbar | Dbar |
| Member | Dbuz6M_v | Dbuzv |
| Suffix | — |  |

In both encodings, the method to produce a pure differential name involves searching for the appropriate structural parts of the encodings to find identical substrings in appropriate places. Tables 3 and 4 respectively illustrate the identical and distinct substrings (as listed in Table 2) for the example container "bar" and member "buz" encodings as well as the resulting strings that form the pure differential name. The "E" in Table 4 represents the number 4, which is the number of characters that precede the separator in the container description. If there is no separator, the position is encoded as "A", which is zero.

TABLE 3

| Container | Member | Differential |
| --- | --- | --- |
| _1 | _1 |  |
| N | c | c |
| DfooDbar | DfooDbar |  |
|  | Dbuz6M_v | Dbuz6M_v |
| — | — |  |

TABLE 4

| Container | Member | Differential |
| --- | --- | --- |
| _0 | _0 |  |
| t6 | f | f |
| Dfoo | Dfoo |  |
|  | 5 | E |
| Dbar | Dbar |  |
|  | Dbuzv | Dbuzv |

FIG. 5B illustrates a differential method 550 of generating compiler related information in a compressed form in accordance with one embodiment of the invention. The differential method 550 represents additional processing performed by a compiler, e.g., the enhanced compiler 402, in generating compiler related information.

Initially, at operation 552, source program information is received. For example, the source program information can be extracted from the source program and received by an enhanced compiler such as the enhanced compiler 402 of FIG. 4. Here, the extracted source program information that is received is in the form of one or more characters that represent a symbol name within the source program. To facilitate understanding, Tables 1–4 provided above are discussed in conjunction with the differential method 400. FIG. 5A illustrated an exemplary declaration portion 500 of a computer program written in the C++ programming language. The symbol names (source program information) extracted from the computer program include "foo", "bar", and "buz" representing, respectively, a namespace, class, and a function identifier defined in C++ programming language. Although compilation of a source program involves many operations, the differential method 550 is concerned with producing differential encodings for symbol names within the source program, which is one task of compiling.

After the extracted source program information is received 552, the extracted source program information is encoded at operation 554. Namely, a symbol name is encoded to produce an encoded symbol name. The operation 554 is typically performed by a compiler during the compiling process. As discussed above, an encoded symbol name is typically significantly longer than the original symbol name received at operation 552. For example, encoded symbols for symbols "foo", "bar", and "buz" are represented in Table 1. Note that the number of characters in the encoded symbol names exceeds the number of characters for the symbol names in the source program.

As noted in operation 556, differential information is generated for the compiler related information (the encoded symbol names). In one embodiment, a differential is generated for an encoded symbol name of a member (e.g., function or class) with respect to its container. To facilitate understanding, in the simple example of Table 3, differentials for "bar" (class) and "buz" (function) can be generated based on the encoded symbol name for "foo" (container). In other words, the symbol "foo" is a base symbol for "bar" and "buz" because both "bar" and "buz" are members of "foo". As will be appreciated by those skilled in the art, base symbols can be programming constructs such as containers (e.g., C++ containers). For example, differentials for "bar" and "buz" may be generated as sequences of characters "nDbar" and "cDbuz6M_v" as noted above. In this way, differential information can be created and utilized to produce symbol names (i.e., differential symbol names) that are significantly shorter (compressed).

After the differential information is generated 556, compressed compiler related information is emitted at operation 558. The emitted compiler related information is, for example, the differential information created at operation 556. Alternatively, other information may be included with or added to the differential information before it is emitted. The resulting differential encoding is referred to as an augmented differential encoding. Here, the compressed compiler related information includes not only the differential information, but also additional information specifying containers for these symbols. For example, the compressed compiler related information for the symbol "bar" is an encoding of the symbol name, namely, "nDbar(0,26)", where "nDbar" is the differential part and "(0,26)" is the associated container part (e.g., container's type number). Likewise, the compressed compiler related information for the symbol "buz" is an encoding of the symbol name, namely, "cDbuz6M_v(0,32)", where "cDbuz6M_v" is the differential part and "(0,32)" is the associated container part (e.g., container's type number). In this example, container information is added to the end of differential encoding for "bar" and "buz". As will be appreciated by those skilled in the art, however, for some cases only the differential encoding is emitted since there is no need to include additional information. However, it should be noted that the encoded information does not necessarily have to be added to the end of the differential encoded symbols. In addition, other information beside container information may be encoded. In comparison with conventional encoded values, the compressed compiler related information (e.g., encoded symbol names) are significantly reduced in size regardless of whether additional information is utilized. In this way, the compressed compiler related information, e.g., a compressed encoded symbol is emitted. As noted above, the emitted compressed information can be used to produce a variety of compressed compiler products, e.g., object files, executable program, browser files, etc.

The compiler performs encoding of symbol names. When the container of a symbol is not known a priori, the compiler generates an augmented differential name which attaches a product-specific container reference to the pure differential name in some manner. Furthermore, many symbols do not have containers, hence cannot have a differential name. Thus, the structure of the compiler product preferably now accepts both non-differential names as well as augmented differential names at the points where there were formerly only non-differential names.

FIG. 6 illustrates a flow diagram of encoding name processing 600 according to one embodiment of the invention. The encoding name processing 600 can encode a symbol's name into a non-differential (i.e., full encoding) name, a differential name, or an augmented differential name.

The encoding name processing 600 begins with a decision 602 that determines whether compression is enabled. When the decision 602 determines that compression is enabled, a decision 604 determines whether the symbol to be encoded has a container. When the decision 602 determines that compression is not enabled, or when the decision 604 determines that the symbol does not have a container, then a non-differential name is generated 606. Here, conventional full encoding is used because compression is not enabled or because the symbol does not have a container. After the non-differential name is generated 606, the non-differential name is emitted 608. After the non-differential name is emitted 608, the encoding name processing 600 is complete and ends.

On the other hand, when the decision 604 determines that the symbol does have a container, then a container reference is generated 610. Next, a pure differential name is generated 612. A decision 614 then determines whether the differential name needs to be augmented. When the decision 614 determines that the differential name does not need to be augmented, then the pure differential name is emitted 616. After the pure differential name is emitted 616, the encoding name processing 600 is complete and ends.

Alternatively, when the decision 614 determines that the differential name needs to be augmented, then the container reference is attached to the pure differential name to produce an augmented differential name. It should be noted that the specific details of generating a container reference and attaching it to the pure differential name is highly dependent upon the specific compiler product. After the augmented differential name is produced, the augmented differential name is emitted 620. Thereafter, the encoding name processing 600 is complete and ends.

It should be noted that compressed compiler products can be uncompressed (unencoded) in accordance with another aspect of this invention. When the compiler produces a differential name, other non-compiler components that utilize compiler products with differential names need to convert differential names to non-differential names. Hence, the structure of the components that use the compiler products preferably now accept compiler products with non-differential names, differential names, and augmented differential names.

Given the full (non-differential) encoded name for a container and the pure differential name for a member, the full (non-differential) encoded name of the member may be reconstructed (unencoded) by combining the common parts of the container's encoded name with the distinct parts of the member's differential name.

Figure 7:
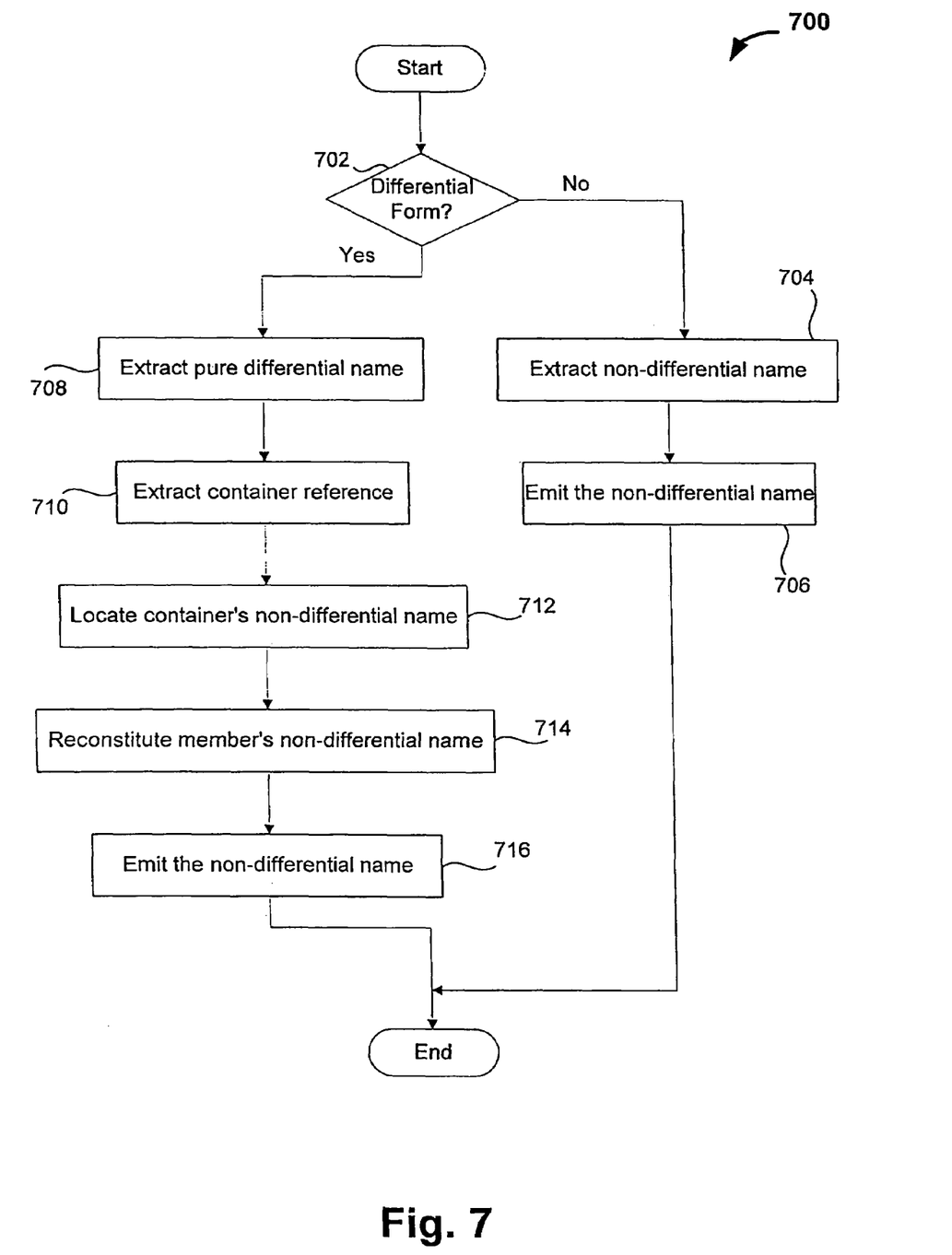
FIG. 7 is a flow diagram of un-encoding name processing according to one embodiment of the invention.

FIG. 7 is a flow diagram of unencoding name processing 700 according to one embodiment of the invention. The unencoding name processing 700 begins with a decision 702 that determines whether the encoded symbol name to be unencoded is in a differential form. When a decision 702 determines that the name to be unencoded is not in a differential form, then a non-differential name is extracted 704. Then, the non-differential name is emitted 706. After the non-differential name is emitted 706, the unencoding name processing 700 is complete and ends.

On the other hand, when the decision 704 determines that the name to be unencoded is in a differential form, then a pure differential name is extracted 708. A container reference is also extracted 710. Then, the container's non-differential name is located 712. Next, the member's non-differential name is reconstituted 714. Thereafter, the non-differential name is emitted 716. After the non-differential name is emitted 716, the unencoding name processing 700 is complete and ends.

In the particular case of the example in Table 4, care must be taken to use the separator position "E" to insert the separator character "5" at the appropriate point within the resulting container description.

The invention has numerous advantages. One advantage is that the length or size of the compiler products can be significantly reduced. Another advantage is that the efficiency at which compiler products can be produced is improved. Yet another advantage is that compiler products utilize less storage space.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of compiling a computer source program into a compressed-object code file containing differential names, said method comprising:
   receiving a source program written in a high-level programming language, the source program including one or more program symbols and non-program symbol information, wherein at least some of the one or more program symbols form containing scopes for other program symbols, the containing scopes being selected from the group consisting of: a namespace, a package, a module, a container object and a function;
   encoding each of the program symbol name of the source program to produce an encoded program symbol name, without changing the non-program symbol information;
   upon determining that the encoded program symbol has a containing scope specified in the source program, determining a differential name for the encoded program symbol name relative to a base symbol identifying the containing scope for the program symbol as specified in the source program, wherein the containing scope defines a context within which the differential name is distinct with respect to the base symbol, and wherein the differential name contains fewer characters than the encoded program symbol name and is formed at least in part by a sequence of characters constituting a subset of the encoded program symbol name; and
   replacing the encoded program symbol name with the differential name to facilitate producing a compressed object code file including the differential name.

2. A method as recited in claim 1, wherein said encoded program symbol name is encoded in an extended format encoding.

3. A method as recited in claim 2, wherein said determining further comprises:
   determining whether an augmented differential encoding is needed; and
   if an augmented differential encoding is needed:
      determining an encoded program symbol name identifier; and
      attaching the encoded program symbol name identifier to the differential encoding.

4. A method as recited in claim 3, wherein the encoded program symbol name identifier is a base symbol identifier indicating a base symbol name associated with at least one of the encoded program symbol names.

5. A method as recited in claim 1, wherein the source program is written in a programming language selected from a group consisting of Ada, C++, Fortran, Pascal, and Java.

6. A method as recited in claim 1, wherein the compressed compiler product contains debugger information.

7. A method as recited in clam 1, wherein the base program symbol is a container object for the program symbol.

8. A method of generating encoded program symbol names in an uncompressed form from compiled information containing differential names, said method comprising:
   receiving a source program including one or more encoded program symbol names, wherein at least some of the one or more program symbols form containing scopes for other program symbols, the containing scopes being selected from the group consisting of: a namespace, a package, a module, a container object and a function;
   determining whether any encoded program symbol names are in a differential format;
   for each program symbol name that is in a differential format:
      extracting a differential program symbol name and a reference to a base symbol identifying a containing scope for the program symbol as specified in the source program, wherein the containing scope defines a context within which the differential name is distinct with respect to the base symbol, and wherein the differential name contains fewer characters than the encoded program symbol name and is formed at least in part by a sequence of characters constituting a subset of the encoded program symbol name;
   using the extracted reference to locate a non-differential name for the base symbol; and
   replacing the differential program symbol name with the non-differential name for the base symbol containing scope to obtain an encoded program symbol name in an uncompressed form, the encoded program symbol name containing more characters than the differential name and including the differential name, whereby a decompressed compiler product including the encoded program symbol name is produced.

9. A method as recited in claim 8, wherein the base program symbol is a container of the program symbol that is represented by the compressed encoded program symbol name.

10. A compiler system suitable for compilation and utilization of source programs, said compiler system comprising:
    an enhanced compiler suitable for generation of enhanced compiler products, the enhanced compiler being operable to:
       receive a source program written in a high-level programming language, the source program including one or more program symbols and non-program symbol information, wherein at least some of the one or more program symbols form containing scopes for other program symbols, the containing scopes being selected from the group consisting of: a namespace, a package, a module, a container object and a function;
       encode each of the program symbol name of the source program to produce an encoded program symbol name, without changing the non-program symbol information;
       upon determining that the encoded program symbol has a containing scope specified in the source program, determine a differential name for the encoded program symbol name relative to a base symbol identifying the containing scope for the program symbol as specified in the source program, wherein the containing scope defines a context within which the differential name is distinct with respect to the base symbol, and wherein the differential name contains fewer characters than the encoded program symbol name and is formed at least in part by a sequence of characters constituting a subset of the encoded program symbol name; and replace the encoded program symbol name with the differential name to facilitate producing a compressed object code file including the differential name;

at least one enhanced non-compiler component operable to understand and utilize the enhanced compiler products; and a computing device operable to execute one or more of the enhanced compiler and the at least one enhanced non-compiler component.

11. A compiler system as recited in claim 10, wherein reduction of size of the enhanced compiler product is up to 40 percent of sizes of conventional compiler products produced by conventional compilers.

12. A compiler system as recited in claim 10, wherein the enhanced compiler product is a compiler related product selected from a group consisting of an object file, an executable file, and debugging information.

13. A computer readable medium including computer program code for compiling a computer source program into a compressed object code file containing differential names, said computer readable medium comprising:

computer program code for receiving a source program written in a high-level programming language, the source program including one or more program symbols and non-program symbol information, wherein at least some of the one or more program symbols form containing scopes for other program symbols, the containing scopes being selected from the group consisting of: a namespace, a package, a module, a container object and a function;

computer program code for encoding each of the program symbol name of the source program to produce an encoded program symbol name, without changing the non-program symbol information;

computer program code for determining, upon determining that the encoded program symbol has a containing scope specified in the source program, a differential name for the encoded program symbol name relative to a base symbol identifying the containing scope for the program symbol as specified in the source program, wherein the containing scope defines a context within which the differential name is distinct with respect to the base symbol, and wherein the differential name contains fewer characters than the encoded program symbol name and is formed at least in part by a sequence of characters constituting a subset of the encoded program symbol name; and computer program code for replacing the encoded program symbol name with the differential name to facilitate producing a compressed object code file including the differential name.

14. A computer readable medium as recited in claim 13, wherein said encoded program symbol name is encoded in an extended format encoding.

15. A computer readable medium as recited in claim 13, wherein the compressed compiler related product is a compiler related product selected from a group consisting of an object file, executable file, and debugging information.

16. A computer readable medium including computer program code generating encoded program symbol names in an uncompressed form from compiled information containing differential names, the encoded program symbol names being associated with compiler information, said computer readable medium comprising:

computer program code for receiving a source program including one or more encoded program symbol names, wherein at least some of the one or more program symbols form containing scopes for other program symbols, the containing scopes being selected from the group consisting of: a namespace, a package, a module, a container object and a function;

computer program code for determining whether any encoded program symbol names are in a differential format;

for each encoded program symbol name that is in a differential format:

computer program code for extracting a differential program symbol name and a reference to a base symbol identifying a containing scope for the program symbol as specified in the source program, wherein the containing scope defines a context within which the differential name is distinct with respect to the base symbol, and wherein the differential name contains fewer characters than the encoded program symbol name and is formed at least in part by a sequence of characters constituting a subset of the encoded program symbol name;

computer program code for using the extracted reference to locate a non-differential name for the base symbol; and computer program code for replacing the differential program symbol name with the non-differential name for the base symbol to obtain an encoded program symbol name in an uncompressed form, whereby a decompressed compiler product including the encoded program symbol name is produced.

* * * * *

UNITED STATES PATENT AND TRADEMARK OFFICE
CERTIFICATE OF CORRECTION

| | | |
|---|---|---|
| PATENT NO. | : 7,080,369 B1 | Page 1 of 1 |
| APPLICATION NO. | : 09/649270 | |
| DATED | : July 18, 2006 | |
| INVENTOR(S) | : Crowl et al. | |

It is certified that error appears in the above-identified patent and that said Letters Patent is hereby corrected as shown below:

In line 1 of claim 7 (column 11, line 59) change "claim 1" to --claim 1--.

Signed and Sealed this

Fifth Day of December, 2006

JON W. DUDAS
*Director of the United States Patent and Trademark Office*